United States Patent [19]

O'Meara

[11] 4,090,066
[45] May 16, 1978

[54] POLARIZATION REFERENCE IMAGING SYSTEM

[75] Inventor: Thomas R. O'Meara, Malibu, Calif.

[73] Assignee: Hughes Aircraft Company, Culver City, Calif.

[21] Appl. No.: 679,302

[22] Filed: Apr. 22, 1976

[51] Int. Cl.² ............................................... H04B 9/00
[52] U.S. Cl. .................................................. 250/199
[58] Field of Search .................. 250/199; 343/5, 6; 356/3

[56] References Cited

U.S. PATENT DOCUMENTS

| | | | |
|---|---|---|---|
| 3,427,611 | 2/1969 | Enenstein | 250/199 |
| 3,615,135 | 10/1971 | Frazer | 250/199 |

*Primary Examiner*—Richard Murray
*Attorney, Agent, or Firm*—Martin E. Gerry; W. H. MacAllister

[57] ABSTRACT

A polarization reference imaging system to determine image of a target comprises three basic major elements. Such elements consist of transmitting means, a matrix of receiving systems and digital processing circuitry. The transmitting means consists of a transmitter and suitable optics for electromagnetically illuminating a target. The receiving systems consist of a matrix of receivers electromagnetically coupled to the target for receiving energy as reflected signals due to illumination of the target which signals are passed by the receiver substantially devoid of atmospheric distortion components. Each of the receivers of the receiving system provide a different weighting factor insofar as amplitude of the received signals is concerned, thereby enabling to obtain not only the shape of the target but also the various intensities of grays, blacks and white of the illuminated target. The digital system is connected for processing the received signals. Such digital system is capable of reconstructing the configuration and different shades of the target.

7 Claims, 3 Drawing Figures

4,090,066

POLARIZATION REFERENCE IMAGING SYSTEM

BACKGROUND OF THE INVENTION

This invention is in the field of polarization reference imaging, or otherwise stated in the field wherein an electromagnetically illuminated target glint is to be received by a matrix of receivers for processing the received signals so as to eliminate atmospheric distortion and reconstruct the shape and highlights of the target.

Prior art systems utilizing a reference source do not have the capability of discriminating against atmospheric distortion.

Also prior art systems have the disadvantage in that all local oscillators therein were required to be frequency-locked, even though phase control was not required.

Still further disadvantages of prior art systems are that analog-to-digital converters used therein are required to be precisely clocked in order to be able to read out information provided by the receivers.

Also, in prior art systems, the analog-to-digital conversion had to be performed at intermediate frequencies rather than at video frequencies.

SUMMARY OF INVENTION

Polarization Referencing Imaging (PRIM) systems are active imaging systems which construct the image based on samples of the field scattered by the target and received by a matrix of receivers feeding a computer system. The image is obtained by a numerical Fourier transform process performed on a digital computer. These systems have advantages over conventional imaging systems in that they are relatively insensitive to the atmospheric path length variations associated with turbulence and relatively insensitive to array element positioning errors.

In the present system, an objective of the invention is accomplished by appropriately coding the received fields according to their polarizations, and separately processing the received returns. Such accomplishment is reliant on the fact that the energy scattered from target glints retains its polarization whereas that energy which is scattered diffusely has a cross-polarized component which contains image information.

Atmospheric and array positioning errors are eliminated by heterodyne detection of each polarized and cross-polarized target return. The polarized return, which comes principally from target glints, serves as a reference which allows for elimination of errors.

The reference would be offset in frequency from the image field information such that the receiver intermediate frequency outputs are at a fixed difference frequency with respect thereto. The two outputs are amplified, separated by filters, and beat one against the other to produce a resultant frequency output which contains the undistorted image information.

DETAILED DESCRIPTION

Figure 1:
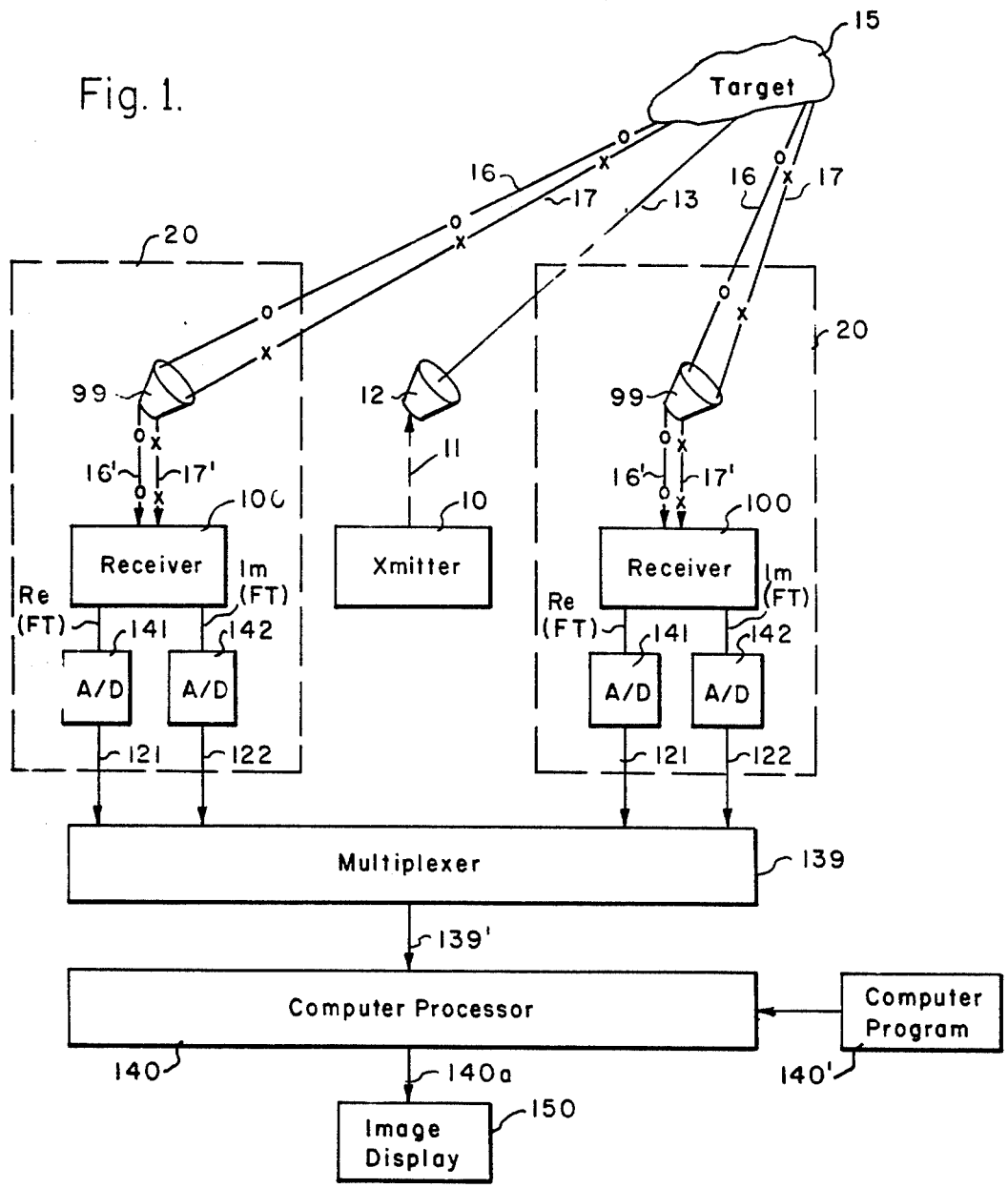
FIG. 1 is an overall schematic of the system in accordance with this invention.

Referring to FIG. 1, laser transmitter 10 transmits a single linear polarization illumination waveform at 11 to telescope 12 which is focused by the telescope along path 13 on target 15, the target to be imaged. However, the focusing must not be sufficiently sharp that the target fails to be substantially uniformly illuminated by the illumination beam.

A cross-polarized component 17 of the illumination waveform is reflected from portions of target 15 which scatter energy diffusely to generate the image samples in receiving system 100. Both propagation paths 16 and 17 reflected from target 15, are generally distorted by atmospheric turbulence such as phase errors which are introduced into the far field samples. Normally, signals along paths 16 and 17 will impinge on receiving telescopes as at 99 to provide signal components 16' and 17' as inputs to receiver 100. The second or polarized component 16 which retains the illuminator polarization, is strongly reflected from glints of the target to generate a reference field at receiving system 100 input with substantially the same atmospheric or propagation phasing errors, since paths 16 and 17 are substantially the same path.

It is the function of receiving system 100 to generate outputs which have real and imaginary components of the Fourier transform of the source field distribution (sampling components). Such sample components, have as a concomitant thereof, the unknown atmospherically induced phase errors substantially eliminated by processing within the receiver. The last step in the process is to generate equivalent digital samples by A/D conversion elements 141 and 142. The processor 140 with aid of a suitable computer program 140' inverse transforms these samples to generate an image at display 150, of the CRT type or the like, substantially free of atmospheric or path distortion.

Figure 2:
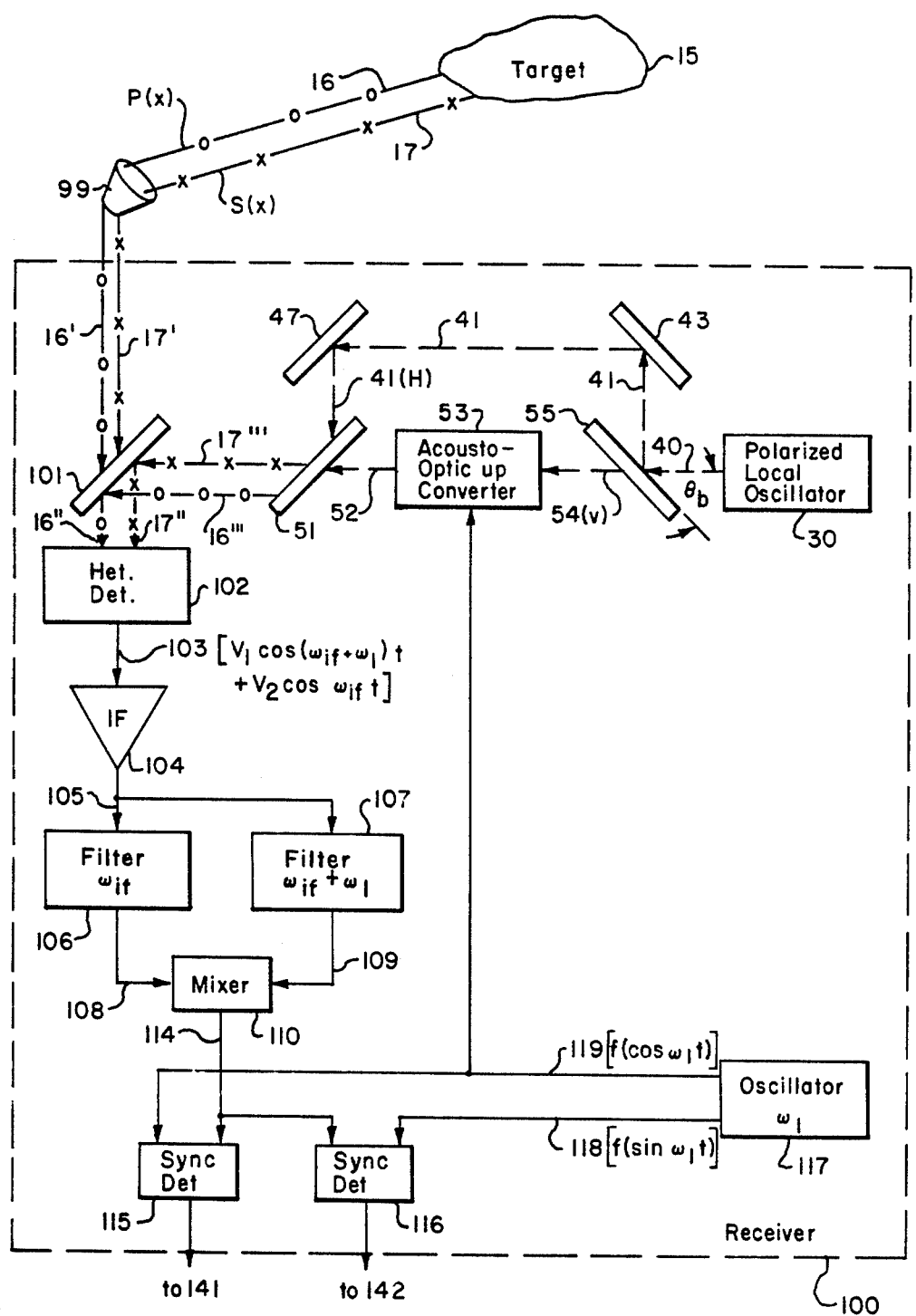
FIG. 2 is a subsystem schematic showing details of the receivers as used in the system of FIG. 1.

Referring to FIG. 2, the means by which the receiver processing system 100 functions to generate its atmospherically undistorted sample is best understood by analysis of the components thereof.

It may be seen that signals at 16 and 17 reflected from target 15 being respectively of the $P(x)$ and $S(x)$ polarization states, are impinged on telescope lens at 99. In such system, the two local oscillator signals are generated, one offset in frequency and polarization state from the other, each matched in polarization to the polarization state of the two signals 16' and 17', transmitted through lens 99, representing the reference and image components. Signals 16' and 17' are impinged on surface of two way mirror or combiner 101, and passed through such mirror as components 16" and 17" respectively to impinge on the surface of heterodyne detector 102. Components 16''' and 17''' also impinging on another surface of mirror 101 will combine with components 16" and 17", to be subsequently discussed. Since each polarization state beats with signals in its matching state only in heterodyne detector 102, the image and reference components are encoded as separate frequencies $(\omega_{if} + \omega_1)$, and $\omega_{if}$ is the detector output at 103, the signal level at 103 being of the form $V_1 \cos(\omega_{if} + \omega_1)t + V_2 \cos \omega_{if} t$. Both signals are amplified by the intermediate frequency amplifier 104, the amplified quantity being present at 105 and available for separation by filters 106 and 107. Filter 106 is responsive to the frequency $\omega_{if}$, whereas filter 107 is responsive to pass the frequency $(\omega_{if} + \omega_1)$. The separated signal components available at 108 and 109 are then beat against each other in mixer 110 to produce a high quality output signal at 114. The output signal is then synchronously detected using synchronous detectors 115 and 116 to produce the output signals Re(FT) and Im(FT), which are the Real and Imaginary portions of the signals detected at 115 and 116 respectively and which are fed to A/D converters 141 and 142 respectively, as illustrated in FIG. 1. Note that FT stands for the signal in direct Fourier Transform format.

Several means can be employed for generation of the required signals offset in frequency. These signals as at 16" and 17" are of differing frequency and have polarization states which are orthogonal to each other. In the illustrated method, local oscillator 30 is shown with 45° polarized output at 40. Beam 40 impinges on beam splitter 55 which is inclined at Brewster's angle $\theta_b$ with respect to the propagation direction of beam 40.

Vertically polarized component 54 enters acousto-optic upconverter 53 where it is shifted upward in frequency. The vertically polarized component exits upconverter 53 at 52 in the same polarized state. A horizontally polarized portion of the beam 40 is propagated along path 41 to impinge on surfaces of mirrors 43 and 47, from which it is reflected on to a surface of a second beam combiner at 51 and combined at said beam combiner 51 with beam 52, to form beams 17''' and 16'''. The 45° angle of polarization is taken between beam at 40 and the plane in which polarization separator 55 lies. The polarization separator 55 may advantageously be wired grid polarizers on Brewster plates for 10.6 micron wavelength operation. Polarization directions resulting will be a vertical polarization component V at 54 and a horizontal polarization component H at 41. The horizontal component is unmodulated while the vertical component is upconverted by acousto-optic upconverter 53 which is fed by oscillator 117 at 119 carrying a signal with a function whose argument may be cos $\omega_1 t$. It should be noted that oscillator 117 has a quadrature signal output at 118 and 119 feeding signals whose arguments are of the functions sin $\omega_1 t$ and cos $\omega_1 t$ respectively as inputs to synchronous detectors 116 and 115 respectively.

Figure 3:
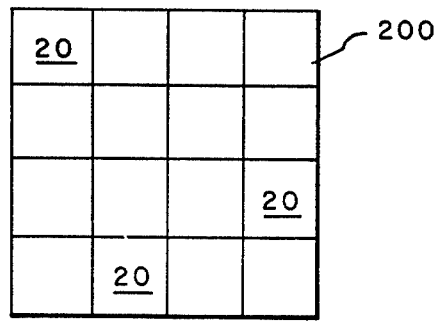
FIG. 3 is an array matrix of receivers according to FIGS. 1 and 2.

Referring to FIGS. 1 and 3, it should be noted that spacing between target 15 and telescopes 99 may be in the order of 40,000 kilometers, and thus fields represented by beams 16-17 may be considered as far-fields since the receiving telescopes are a substantial distance from the target or scatterer 15. It is well recognized in the art of electromagnetic theory that such far-fields received at 99 is most exactly expressed in terms of the direct Fourier transform as a function of spatial separation from the scatterer and the receivers, hence Fourier direct transformation is a natural phenomena, and the processor following the receivers need only provide the inverse Fourier transform of the received signals to obtain a function in the time domain.

With respect to distortion components, these will have been removed when the multiplexed signal at 139' containing the real and imaginary component pairs as output of multiplexer 139 are handled by computer 140. The computer, utilizing computer program 140' inverse transforms such signal pairs from the complex domain to the time domain. Such inverse Fourier transformed signals at 140a are applied to the Z or intensity axis of CRT display 150 to reconstruct the configuration of target 15 by evaluating the weighting factors of different shades of white, black or gray seen by each system 20. All systems 20 are combined in a matrix of receive systems as at 200.

The far-field at the input to each receiving system 20 is as a natural phenomena in complex form (direct Fourier transform). The reflectivity coefficient or factor of target 15 is related to the field at 12 reflected from target 15 and may be simply stated as being the incident field 13 from the illuminating transmitter multiplied by the reflectivity coefficient. The intensity of light at each receiving system is differently weighted as a function of the position of each receiving system 20 in the array 200, remembering that the entire target is illuminated and that each receiving system 20 receives a reflected beam covering all points of area of target 15. Thus each receiving system 20 will have a different weighting factor, and the combined inputs of receiving beams 16-17 are converted by computer 140 to reconstruct the shape and shades of black, gray and white of target 15, when a matrix such as 200 of receiving systems 20 is utilized.

It has been shown in U.S. patent application Ser. No. 641,329, filed by W. P. Brown, Jr., Dec. 16, 1975, now U.S. Pat. No. 4,044,247, that the output of A/D converter 141 at 121 is proportional to the function $$|\tilde{G}|^2 \int dx' \ |u(x') \ \rho(x')| \cos \left| \frac{k \ x \cdot x'}{|x|} \right| \tag{1}$$

which is $[\tilde{G}]^2$ times the real part of the Fourier transform of the field diffusely reflected from the scatterer, and the output of A/D converter 142 at 122 is proportional to the function $$|\tilde{G}|^2 \int dx' \ |u(x') \ \rho(x')| \sin \left| \frac{k \ x \cdot x'}{|x|} \right| \tag{2}$$

which is $[\tilde{G}]^2$ times the imaginary part of the Fourier transform of the field diffusely reflected from the scatterer.

It should be noted that expressions (1) and (2) contain the weighting factor discussed, which is $$\left| \frac{k \ x \cdot x'}{|x|} \right| \tag{3}$$

where:
$x$ is a point at the receiver antenna
$x'$ is a point on the surface of the scatterer or target
$[x]$ is the magnitude of vector $x$
$k$ is a coefficient.

Therefore, it is obvious since the weighting factor comprises a vector quantity, which is a function of magnitude and phase, and that the wavefront impinging on the receiving antenna will be at different angles with respect to the target, that the expression at (3) will have different concentrations of light and dark shading with different angles, although the entire image of the target is capable of being observed by each receiver at distances between target and receivers at which the system usually operates, in the order of 40,000 kilometers.

Multiplexer circuit 139 being connected to outputs of converters 141 and 142 provides an input to a digital computer at 140 such as IBM Model 360. A suitable computer program 140' preferably in FORTRAN IV language is provided as input to computer 140, to process data coming from the multiplexer. CRT display 150 connected to output of computer 140 is provided in order to display signals received from an array of receivers, such as 100 herein.

The output of multiplexer 139 is the input to digital computer 140 which represents the last point in the receiving system where signals, in direct Fourier transform format less atmospheric distortion components are processed by the digital computer 140, which performs inverse Fourier transformation and enables the display of the inverse transformed signal on a CRT tube, for example, by applying the output of computer 140a to intensity modulation axis (Z-axis) of the CRT.

An image of the scatterer (the object in space) can be obtained by utilizing a number of receivers of the type shown in FIG. 1 at different points $x$, i.e., an array of receivers is utilized, instead of one receiver. The desired image is then obtained by performing numerically an inverse Fourier transform of the data values supplied by the receiver array.

The computer program as at 140' utilized is one of the known and published programs in International Business Machine Corporation (IBM) Applications Program (Bulletin GH20-0205-1) for System/360 Scientific Package, Version III of Programmer's Manual for program number 360A-CM-03X, tailored for the FORTRAN language. Within this Program Package, which is the Fifth Edition published August 1970, the subroutine HARM is the program used. The HARM subroutine provides capability slightly in excess of the requirements herein in that it supplies solutions for inverse Fourier transformation by the computer when a three dimensional array is used. Here we have only a two dimensional array, and consequently when the data comprising parameters of two dimensional array are inputted, no data will be provided for the third dimension in which case the computer program HARM at 140' will treat the absence of the third dimensional value as zero, and a true construction of the image on display 150 will result. The HARM program is found in the referenced manual at pages 276–279.

It should be noted that most computers have a memory limited in the number of bits of information or words stored therein. In such case the IBM Systems 360 are provided with auxiliary storage capability to take the overflow of information that cannot be stored in the memory within the computer. The auxiliary storage means transfers the data stored therein to the memory in the computer as the computer-stored data is utilized. In this regard the auxiliary system employs memory storage and shift register banks, all known in the art.

CRT display of 150 for constructing various shades of black, gray and white to receive computer inputs thereto as at 140a by techniques self-contained and used therein are well known in the art. Among the variety of displays 150 made are Princeton Model 801 Graphic Computer Terminal, Instruction 008-2, Issue 1-303, Part No. 18001-0014, made by Princeton Electronic Products, Inc. of North Brunswick, N.J. Another such display tailored to IBM systems 360 computers is made under the trade name of ANAGRAPH by Data Disk of Sunnyvale, Calif. Still another display 150 is made under the trade name of Conographics-12, by Hughes Aircraft Company, Industrial Products Division, Oceanside, Calif.

What is claimed is:

1. A polarization reference imaging system for detection of a target, comprising in combination:
    transmitting means for electromagnetically illuminating the target;
    a matrix of receiving means electromagnetically coupled to the target for receiving energy reflected as signals from illumination of the target substantially devoid of atmospheric distortion components, each said receiving means providing a different weighting factor for the received signals; and
    digital means connected to the receiving means.
2. The invention as stated in claim 1, wherein said transmitting means transmits a single electromagnetic beam directed at the target.
3. The invention as stated in claim 1, wherein each receiving means comprises:
    a receiving telescope;
    a receiver generating real and imaginary output components therefrom; and
    analog-to-digital converters for transforming the real and imaginary components of the received signal into digital form.
4. The invention as stated in claim 3, wherein the digital means comprises:
    a multiplexer connected to outputs of the analog-to-digital converters.
5. The invention as stated in claim 4, wherein each receiver comprises:
    a first beam splitter combiner electromagnetically coupled to the receiving telescope;
    a heterodyne detector electromagnetically coupled to the first beam splitter; and
    an intermediate frequency amplifier connected to the output of the heterodyne detector.
6. The invention as stated in claim 5, including:
    a second beam combiner electromagnetically coupled to the first beam splitter;
    an acousto-optic upconverter the output of which is electromagnetically coupled to the second beam splitter;
    a beam splitter electromagnetically coupled to the acousto-optic upconverter;
    a local oscillator providing horizontally and vertically polarized components;
    a first mirror electromagnetically coupled to the third beam splitter and receiving vertically polarized components reflected from the beam splitter; and
    a second mirror optically coupled to the first mirror and reflecting therefrom said horizontally polarized components on to the second beam combiner for transmission to the first beam combiner and reflection therefrom as an input to the heterodyne detector.
7. The invention as stated in claim 6, including:
    a first and second filter, each connected to the output of the intermediate frequency amplifier;
    an RF oscillator having quadrature outputs, one of the quadrature outputs thereof being connected to the acousto-optic upconverter;
    a pair of synchronous detectors connected to said quadrature outputs of the RF oscillator; and
    a mixer fed by the first filter providing the center frequency output from the intermediate frequency amplifier and fed by the second filter providing an output of the sum of the RF oscillator frequency and the center intermediate frequency, the mixer output being an input to the pair of synchronous detectors.

* * * * *

UNITED STATES PATENT AND TRADEMARK OFFICE
CERTIFICATE OF CORRECTION

PATENT NO. : 4,090,066

DATED : May 16, 1978

INVENTOR(S) : Thomas R. O'Meara

It is certified that error appears in the above-identified patent and that said Letters Patent are hereby corrected as shown below:

Column 4, line 28 should read:

$$|\tilde{G}|^2 \int d\underline{x}' \ |u(\underline{x}') \ \rho(\underline{x}')| \ \cos \left| \frac{k \ \underline{x} \cdot \underline{x}'}{|\underline{x}|} \right| \qquad (1),$$

Column 4, line 37 should read:

$$|\tilde{G}|^2 \int d\underline{x}' \ |u(\underline{x}') \ \rho(\underline{x}')| \ \sin \left| \frac{k \ \underline{x} \cdot \underline{x}'}{|\underline{x}|} \right| \qquad (2),$$

UNITED STATES PATENT AND TRADEMARK OFFICE
CERTIFICATE OF CORRECTION

PATENT NO. : 4,090,066
DATED : May 16, 1978
INVENTOR(S) : Thomas R. O'Meara

It is certified that error appears in the above-identified patent and that said Letters Patent are hereby corrected as shown below:

Column 4, lines 45-52 should read:

$$\left| \frac{k \underline{x} \cdot \underline{x}'}{|\underline{x}|} \right| \qquad (3)$$

where: $\underline{x}$ is a point at the receiver antenna $\underline{x}'$ is a point on the surface of the scatterer or target $|\underline{x}|$ is the magnitude of vector $\underline{x}$ Claim 5, line 29, column 6 should read:

a first beam combiner electromagnetically

Signed and Sealed this

*Fourteenth* Day of *November 1978*

[SEAL]

Attest:

RUTH C. MASON
*Attesting Officer*

DONALD W. BANNER
*Commissioner of Patents and Trademarks*